United States Patent [19]

Berger et al.

[11] 4,392,576

[45] Jul. 12, 1983

[54] MULTILAYERED CONTAINER INCLUDING A LAYER OF MICROCRIMPED METALLIC FOIL

[75] Inventors: Richard F. Berger, Huntington; Greg Pardes, New York; Bernard R. Gerber, Jamaica, all of N.Y.

[73] Assignee: The Reseal Container Corporation of America, New York, N.Y.

[21] Appl. No.: 270,244

[22] Filed: Jun. 4, 1981

[51] Int. Cl.³ ............................................ B65D 23/02
[52] U.S. Cl. ................................. 215/1 C; 215/12 R
[58] Field of Search ...................... 215/1 C, 1 R, 12 R, 215/DIG. 6; 220/442, 450, DIG. 12; 428/35, 174, 180; 229/3.5 MF

[56] References Cited

U.S. PATENT DOCUMENTS

| | | | |
|---|---|---|---|
| 3,547,294 | 12/1970 | Williams | 215/1 C |
| 4,079,850 | 3/1978 | Suzuki et al. | 215/1 C |
| 4,174,783 | 11/1979 | Abe et al. | 215/1 C |
| 4,278,716 | 7/1981 | Buchner et al. | 220/450 X |

FOREIGN PATENT DOCUMENTS 2025889  1/1980  United Kingdom ............... 215/1 C Primary Examiner—William Price
Assistant Examiner—Sue A. Weaver
Attorney, Agent, or Firm—Toren, McGeady and Stanger

[57] ABSTRACT

A container is formed with a multilayered wall structure including at least one layer of a plastics material and at least one layer of a multidirectionally microcrimped metallic foil. Initially, the wall structure is in the form of a preform or parison incorporating the multilayered wall structure and the preform is blow-molded to the desired shape. The preform can be blow-molded into a container with a complicated wall configuration. The metallic foil is substantially impervious to the passage of gases, vapor, liquids and microorganisms into or out of the container.

10 Claims, 6 Drawing Figures

MULTILAYERED CONTAINER INCLUDING A LAYER OF MICROCRIMPED METALLIC FOIL

SUMMARY OF THE INVENTION

The present invention is directed to a preform which can be blow-molded into a container and, more particularly, wherein the preform and the container both incorporate a multidirectionally microcrimped metallic foil as a part of its wall structure.

In recent years there has been a steadily increasing use of plastic containers in a variety of shapes. Depending on the type of material stored in such containers it is often necessary to provide thick walls of relatively expensive plastics materials providing a high barrier characteristic against the inflow or outflow of gases, vapors or liquids. While some of the containers have a simple cylindrical shape others have complicated shapes formed of planar and/or curved surfaces.

In the blow-molding of containers it is relatively simple to deform a plastics material preform into a desired shape, however, it is often difficult without greatly increasing the cost of such containers to provide walls with a high barrier property such as is known in metal containers. In blow-forming containers, "biaxially-oriented" plastics material permits the formation of containers with a complicated shape achieving increased barrier properties but these do not approach those of metal.

Therefore, it is the primary object of the present invention to provide a container formed in a blow-molding operation and having a multilayered wall structure which is formed by at least one layer of a plastics material and at least one layer of a multidirectionally microcrimped metallic foil.

Another object of the present invention is to provide a parison or preform for blow-molding containers with the preform having a multilayered wall structure including at least one layer of a plastics material and at least one layer of a microcrimped metallic foil.

In accordance with the present invention, a preform for a container has a wall structure including at least one layer of a plastics material and at least one layer of a metallic foil substantially impervious to gases, vapors, liquids and microorganisms. The preform is heated and then blow-molded into the desired shape. To assure the ability of the metallic foil to expand multidirectionally during blow-molding, the foil is micropleated or microcrimped and is reduced in size in at least two transverse directions in the range of 50 to 20% of its original size.

In the past, attempts to incorporate a metallic foil layer with one or more plastics material layers in a preform and then to blow-mold a container has not met with commercial success, because it has not been possible to provide a cost effective metallic foil as a barrier in a container. During expansion to the desired size and shape an unpleated foil tends to rupture and lose its imperforate character so that its barrier feature is lost.

The crimping of metal structures is well known. However, the crimping has been done in one direction only, or at best, randomly in two directions. We propose to use uniform mechanical bidirectional or multidirectional crimping to blow-mold a container so that the metallic foil expands in more than one direction providing the desired shape while retaining its high barrier property. In the formation, particularly by blow-molding, of containers required to have a high barrier property it has been necessary to use heavy-walled containers usually formed of an expensive plastics material. If, however, the wall structure of the container is made up of one or more layers of a plastics material and one or more layers of a multidirectionally microcrimped metallic foil, it is possible to provide high barrier properties and at the same time considerably reduce the wall thickness and replace expensive plastics material with less costly ones.

In accordance with the present invention, the metallic foil is microcrimped in at least two transversely extending directions so that the original size of the foil is significantly reduced. The microcrimping operation can be similar to the one used in forming crepe paper which give the paper a certain resilience or stretchability. If the foil is microcrimped in only one direction, then in blow-molding where it is expanded in two directions it will be unable to accommodate expansion in one of the directions. By microcrimping in at least two directions it is possible to assure that the desired expansion from a preform into a final container shape can be attained without the damage experienced by an uncrimped metal foil, and with the finished container having a high barrier property.

Preferably, the metallic foil is an aluminum foil having a thickness of about one ten thousandth of an inch. Other metallic foils can be used as may be required in accordance with the type of material stored in a container. The metallic foil can be given a surface treatment so that it bonds to the plastics material. The number of layers of metallic foil used also depends on the conditions involved. The metallic layer or layers can be sandwiched between a pair of plastics material layers or the metallic foil can be used as the inside surface of the container. If the metallic foil forms the inside surface of the container it may be necessary to coat its surface depending on the type of material being stored.

In the past it has been known to provide large scale pleating in one direction of metal foil liners used as inserts in injection-molded containers having shapes with simple curves. The use of microcrimping or micropleating in at least two transversely extending directions has not been used in the past. Using microcrimped metallic foil it is possible to make containers with complex shapes and to provide them with a consistent uniform barrier. Preferably, the metallic foil is microcrimped in two perpendicularly extending directions, however, it is possible to perform the microcrimping so that the two directions are not normal to one another. Further, the metallic foil can be microcrimped in more than two directions depending on the expansion characteristic desired.

A wide variety of plastics materials can be used in combination with metallic foil, such as polyethylene, nylon, PET acrylonitrile copolymers, and other similar plastics material used for forming containers.

The barrier layer provided by the metallic foil must be substantially impervious to gases, liquids, vapor, and microorganisms. By using the barrier metallic foil layer it is possible to significantly reduce the wall thickness of the container so that a much thinner plastics material layer or layers can be used.

By blow-molding it is possible to produce a great variety of container shapes, particularly complicated curved structures or walls with a variety of planar or planar and curved surfaces. Where thick plastic walls have been used in the past, it has, at times, been difficult to provide complicated shapes. By using the combination of plastics material and metallic foil layers the wall thickness is significantly reduced and it is possible to provide sharply defined complicated wall shapes while maintaining the wall integrity against leakage, inwardly or outwardly, of gases, vapors, liquids and microorganisms.

In carrying out the method of blow-molding a parison or preform into a container, initially a sheet of metallic foil of the required size for forming the preform is microcrimped or micropleated in at least two directions extending transversely of one another and preferably perpendicularly, until the metallic foil has been reduced in each direction to about 50 to 20% of the original dimension. If necessary, the metallic foil can be surface-treated to provide a bond with the plastics material or it can be coated in the event a coating is needed when the metallic foil lines the interior of the container. The layers of the microcrimped metallic foil and the plastics material are assembled together in the desired manner to form a multilayered wall. The multilayered wall is made into a preform in the shape of a tube closed at one end and open at the other. The preform is heated and blow-molded to expand the multilayered wall so that the plastics material layer or layers and the metallic foil layer or layers are expanded in two transversely extending directions into the desired container configuration.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
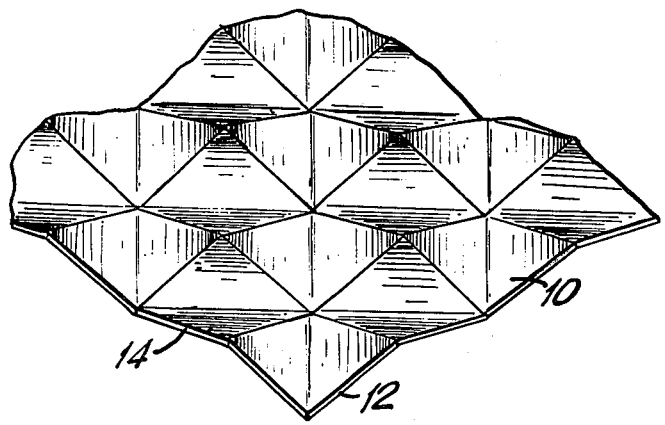
FIG. 1 is a partial view of a multidirectionally microcrimped section of metallic foil.

In FIG. 1 a portion of a multidirectionally microcrimped sheet of metallic foil 10 is shown with the sheet having a first side 12 extending approximately perpendicularly of a second side 14. The sheet of foil 10 is microcrimped first in the direction of side 12 until the entire sheet is crimped and reduced from its original length to approximately 50 to 20% of that length. Next, the sheet is reoriented relative to the crimping device and is crimped in the direction of side 14 until it is completely crimped and reduced from its original size to approximately 50 to 20% of that size.

With the sheet of metallic foil 10 microcrimped in two substantially perpendicular directions its original size is significantly reduced and it is capable of being expanded at least two-directionally. Depending on the shape of the container in which the foil is used it can be microcrimped in more than two directions. Further, a portion of the sheet could be two-directionally microcrimped while other portions could be microcrimped in more than two directions. Preferably, the sheet of metallic foil 10 is formed of aluminum, however, it would also be possible to form it of other metallic foil depending on the use to which the container formed in part by the foil is to be employed. The metallic foil is relatively thin having a thickness of about one ten thousandth of an inch. It can be appreciated that the thickness of the foil can be varied depending on the strength required for the container and the product to be stored in the container.

Figure 2:
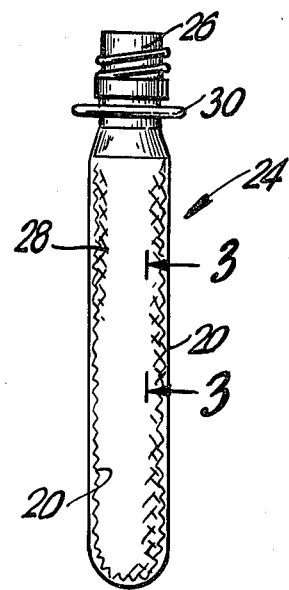
FIG. 2 is an elevational view of a preform incorporating the microcrimped metallic foil shown in FIG. 1.
Figure 3:
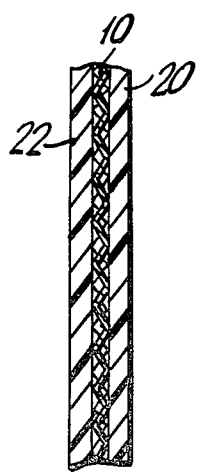
FIG. 3 is a partial sectional view of the wall of the preform displayed in FIG. 2.

The microcrimped metallic foil 10 is sandwiched between a pair of plastics material layers 20, 22, note FIG. 3 and the multilayered wall is shaped into the preform 24 shown in FIG. 2. If necessary, one or both surfaces of the metallic foil sheet 10 can be roughened or otherwise treated to assure a bond with the layers of plastics material.

The preform 24 has a threaded neck 26 at its open end while the other or lower end is closed. Intermediate the neck 26 and the main body portion 28 of the preform there is an annular collar 30 used for positioning the preform during blow-molding. First, the preform 24 is heated and then blow-molded providing the container 32 shown in FIG. 4. The open threaded neck 26 and the collar 30 are not expanded in the blow-molding operation, rather they remain the same. The threaded neck is ready to receive a threaded cap as a closure for the container 32.

During blow-molding, the multilayered wall of the preform is expanded outwardly and in its axial direction with the layers 20, 22 of plastics material sandwiching the metallic foil 10 and being forced into closer contact. During blow-molding, as the preform expands at least bi-directionally, the microcrimped metallic foil 10 expands in both directions so that its opposite surfaces are in contacting engagement with the juxtaposed surfaces of the plastics material layers 20, 22.

Figure 4:
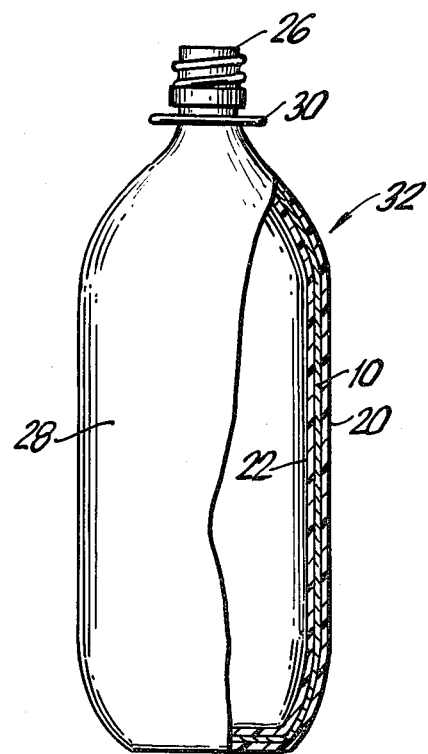
FIG. 4 is an elevational view, partly in section, of a bottle-shaped container blow-molded from the preform illustrated in FIG. 2.

As can be seen in FIG. 4, one of the layers 22 of plastics material forms the inside surface of the container protecting the metallic foil 10. Because of the presence of the metallic foil 10 the container has a much higher barrier property than a similar container having the same or even greater wall thickness formed only of plastics material. The presence of the metallic foil 10 enables the wall thickness of the container to be significantly reduced while increasing the strength and barrier properties of the container. With the metallic foil 10 forming a part of the wall structure of the container 32 it is possible to substantially prevent the flow of gases, vapors, liquids or microorganisms either out of or into the container.

Figure 5:
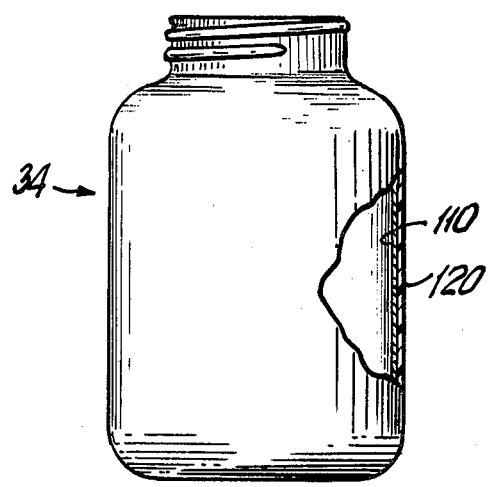
FIG. 5 is an elevational view of another container, partly in section embodying the present invention.

In FIG. 5 another container 34 is shown formed in accordance with the present invention, however, as distinguished from FIG. 4, apart from its shape, the wall structure of the container consists of an inner layer of metallic foil 110 and an outer layer of a plastics material 120. This construction provides a two-layered wall structure. It can be appreciated that the material stored within the container 34 must be compatible with the metallic foil 110 or, the inside surface of the metallic foil could be coated as required. The container 34 is formed in a blow-molding operation from a preform similar to the one shown in FIG. 2.

Figure 6:
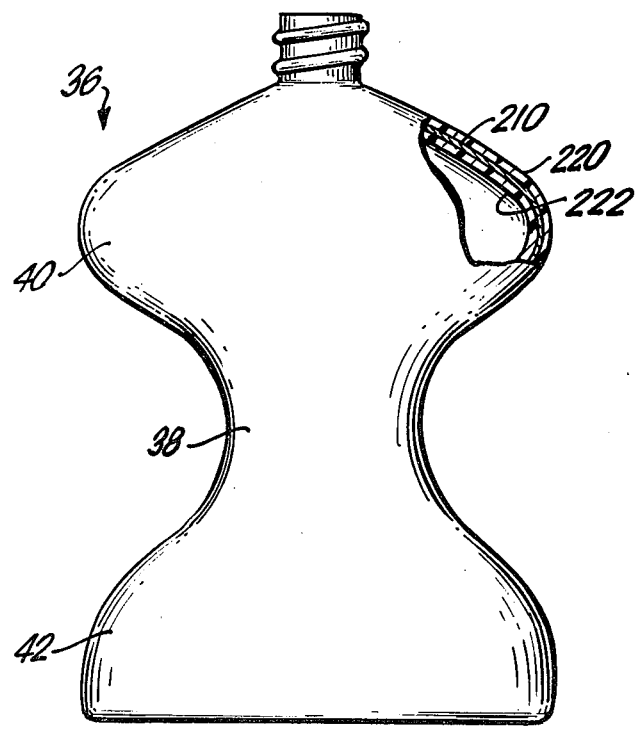
FIG. 6 is still another embodiment of a container incorporating the present invention and provided with a complicated curved shape.

In FIG. 6 still another container 36 is shown blow-molded from a preform similar to the one shown in FIG. 2, however, the container is provided with a complicated curved shape and its wall structure consists of a metallic foil layer 210 sandwiched between an outer layer 220 and an inner layer 222 of a plastics material. It can be appreciated that the multiple curved surfaces of the container 36, having a different radii of curvature, cause a greater expansion of the metallic foil 210 in some regions rather than in others. The necked-down portion 38 of the container intermediate its upper portion 40 and lower portion 42 would have the metallic foil expanded to a lesser degree. It is possible that the manner in which the foil 210 is microcrimped could be varied in accordance with the different expansion characteristics required for the different portions of the container 36.

Each of the containers shown in FIGS. 5 and 6 have a threaded neck portion onto which a closure cap can be screwed.

For reasons of simplicity the wall structure of the containers is shown formed either of a two-layer, FIG. 5, or three-layer, FIGS. 4 and 6, construction. Depending on the various requirements of the container it is possible to provide two or more layers of the metallic foil and two or more layers of the plastics material with the position of the layers varying in accordance with the requirements of the container. An almost limitless variety of shapes can be provided using the present invention while maintaining a high barrier property and high strength of the container, because of the combination of the metallic foil layer or layers and the plastics material layer or layers. Where there is a sharp deviation in the shape of the container, for instance from a curved surface to a planar surface or from one sharply curved surface to another, the metallic foil assures the barrier property of the container and also of its light weight. By virtue of the present invention it is possible to reduce significantly the material costs involved in making containers while ensuring that the barrier properties of the containers is maintained at a high level.

In one example of the microcrimping operation the depth of the crimp in one direction is about 100 times the foil thickness and in the second direction about 40 times the foil thickness. The spacing between individual crimped lines is twice the web thickness plus approximately 15%.

While specific embodiments of the invention have been shown and described in detail to illustrate the application of the inventive principles, it will be understood that the invention may be embodied otherwise without departing from such principles.

We claim:

1. A container blow molded from a multilayered wall preform comprising a wall structure forming a closed end, an oppositely disposed open end, and side walls extending between the closed end and the open end, said wall structure comprising a continuous multilayered wall forming said closed end and said side walls to at least adjacent the open end, said multilayered wall having an inner surface defining the inner surface of the container and an outer surface defining the outer surface of the container, said multilayered wall comprising at least one layer of an expanded plastics material and at least one layer of an expanded at least two-directionally microcrimped metallic foil with the metallic foil in surface contact with said plastics material layer wherein during blow molding of the preform said multilayered wall is expanded from the preform state into the desired container configuration.

2. A container, as set forth in claim 1, wherein said multilayered wall comprises an inner layer and an outer layer formed of plastics material and an intermediate layer formed of said microcrimped metallic foil in surface contact with the inner and outer layers.

3. A container, as set forth in claim 1, wherein said multilayered wall comprises at least two layers of the plastics material and at least two layers of said microcrimped metallic foil.

4. A container, as set forth in claim 1, wherein said microcrimped metallic foil forms the inner surface of said container.

5. A container, as set forth in claim 4, wherein the surface of said microcrimped metallic foil lining the interior of said container is coated with a material compatible with the material to be stored in said container.

6. A container, as set forth in claim 1, wherein said microcrimped metallic foil has a thickness of approximately one ten-thousandth of an inch.

7. A container, as set forth in claim 6, wherein said microcrimped metallic foil is formed of an aluminum foil.

8. A container, as set forth in claim 1, wherein said at least one layer of a plastics material is formed of one of the group consisting of polyethylene, nylon, PET, acrylonitrile copolymers, polystyrene, polyvinyl chloride.

9. A container, as set forth in claim 1, wherein said side walls of said container have a curved shape and comprise at least two different curved surfaces each having a different radius of curvature.

10. A container, as set forth in claim 1, wherein said side walls include planar portions and curved portions.

* * * * *